US009423993B2

(12) United States Patent
Sato (10) Patent No.: US 9,423,993 B2
(45) Date of Patent: Aug. 23, 2016

(54) NON-TRANSITORY COMPUTER-READABLE MEDIUM STORING COMMUNICATION PROGRAM INCLUDING EXTERNAL DEVICE TYPE JUDGING AND COMMUNICATION DEVICE INCLUDING EXTERNAL DEVICE TYPE JUDGING

(71) Applicant: Hirokazu Sato, Nagoya (JP)

(72) Inventor: Hirokazu Sato, Nagoya (JP)

(73) Assignee: BROTHER KOGYO KABUSHIKI KAISHA, Nagoya-shi, Aichi-ken (JP)

(*) Notice: Subject to any disclaimer, the term of this patent is extended or adjusted under 35 U.S.C. 154(b) by 96 days.

(21) Appl. No.: 14/188,834

(22) Filed: Feb. 25, 2014

(65) Prior Publication Data

US 2014/0285826 A1 Sep. 25, 2014

(30) Foreign Application Priority Data

Mar. 21, 2013 (JP) .................................. 2013-057499

(51) Int. Cl.
| | |
|---|---|
| *H04N 1/00* | (2006.01) |
| *G06F 3/12* | (2006.01) |
| *G06F 3/048* | (2013.01) |
| *G06F 17/30* | (2006.01) |
| *H04W 4/00* | (2009.01) |
| *H04M 1/725* | (2006.01) |

(52) U.S. Cl.
CPC ............ *G06F 3/1292* (2013.01); *G06F 3/1204* (2013.01); *G06F 3/1236* (2013.01); *G06F 3/1247* (2013.01); *G06F 3/1297* (2013.01); *H04N 1/00347* (2013.01); *G06F 3/048* (2013.01); *G06F 17/30058* (2013.01); *H04M 1/7253* (2013.01); *H04N 2201/0015* (2013.01); *H04N 2201/0027* (2013.01); *H04N 2201/0072* (2013.01); *H04N 2201/0094* (2013.01); *H04W 4/008* (2013.01)

(58) Field of Classification Search
None
See application file for complete search history.

(56) References Cited

U.S. PATENT DOCUMENTS

| | | | |
|---|---|---|---|
| 2008/0052710 A1* | 2/2008 | Iwai et al. ...................... 718/100 |
| 2009/0036056 A1* | 2/2009 | Oshima et al. ................ 455/41.3 |
| 2009/0066998 A1* | 3/2009 | Kato ............................. 358/1.15 |
| 2009/0103124 A1* | 4/2009 | Kimura et al. ............... 358/1.15 |
| 2011/0177780 A1 | 7/2011 | Sato et al. |
| 2013/0128305 A1* | 5/2013 | Grabkowitz et al. ........ 358/1.15 |

(Continued)

FOREIGN PATENT DOCUMENTS

| | | |
|---|---|---|
| JP | 2007-166538 A | 6/2007 |
| JP | 2011-146991 A | 7/2011 |

*Primary Examiner* — Miya J Cato
(74) *Attorney, Agent, or Firm* — Scully Scott Murphy and Presser (57) ABSTRACT

There is provided a non-transitory computer-readable medium storing a communication program. The communication program is configured to cause a communication device to perform: judging a type of the external device based on information received from the external device by the near field communication protocol; generating the printing data, in a case that it is judged that the type of the external device is a first external device configured to execute printing; transmitting the generated printing data to the first external device by a communication protocol; and transmitting, in a case that it is judged that the type of the external device is a second external device to which the to-be processed data or an image data corresponding to the to-be processed data is transmitted, the to-be processed data or the image data corresponding to the to-be processed data to the second external device by the communication protocol.

15 Claims, 8 Drawing Sheets

(56) References Cited

U.S. PATENT DOCUMENTS

2014/0211257 A1* 7/2014 Ishii .................. H04N 1/32539
358/1.15

2014/0268225 A1* 9/2014 Shibukawa ........ H04N 1/00204
358/1.15

* cited by examiner

NON-TRANSITORY COMPUTER-READABLE MEDIUM STORING COMMUNICATION PROGRAM INCLUDING EXTERNAL DEVICE TYPE JUDGING AND COMMUNICATION DEVICE INCLUDING EXTERNAL DEVICE TYPE JUDGING

CROSS REFERENCE TO RELATED APPLICATION

The present application claims priority from Japanese Patent Application No. 2013-057499, filed on Mar. 21, 2013, the disclosure of which is incorporated herein by reference in its entirety.

BACKGROUND OF THE INVENTION

1. Field of the Invention

The present invention relates to a non-transitory computer-readable medium storing a communication program and a communication device.

2. Description of the Related Art

Conventionally, there is known a technique as follows. That is, after an authentication process for a communication protocol of data is executed by a near field communication protocol such as Near Field Communication (NFC), the near field communication protocol is changed to a communication protocol authenticated by the authentication process to perform data communication.

The above technique is based on the assumption that the combination of two devices which communicate with each other has been previously determined depending on various uses such as printing, reading of a document, and a play of music. Therefore, in a case that a device performs data communication using the above technique with various kinds of devices, each of which is a counterpart device as a communication destination, depending on the uses, a user needs to select the counterpart device or the use in each case, which is inconvenient.

SUMMARY OF THE INVENTION

The present teaching has been made taking the foregoing circumstances into consideration, an object of which is to provide a non-transitory computer-readable medium storing a communication program and a communication device, the communication program being configured so that a device is capable of readily performing data communication with different types of devices, each of which is a counterpart device as a communication destination, by a predetermined communication protocol after connection using a near field communication protocol.

According to a first aspect of the present teaching, there is provided a non-transitory computer-readable medium storing a communication program executable by a controller of a communication device configured to communicate with an external device by a near field communication protocol, the communication program being configured to cause the communication device to perform:

judging a type of the external device based on information received from the external device by the near field communication;

generating, in a case that it is judged that the type of the external device is a first external device configured to execute printing based on a printing data, the printing data based on a to-be processed data and a print setting stored in a storage section;

transmitting the generated printing data to the first external device by a communication protocol; and transmitting, in a case that it is judged that the type of the external device is a second external device to which the to-be processed data or an image data corresponding to the to-be processed data is transmitted, the to-be processed data or the image data corresponding to the to-be processed data to the second external device by the communication protocol.

According to the communication program of the first aspect of the present teaching, the controller of the communication device judges the type of the external device based on the information received from the external device by the near field communication protocol. In the case that it is judged that the external device is the first external device, the printing data generated based on the to-be processed data and the print setting stored in the storage section is transmitted to the first external device by the predetermined communication protocol. On the other hand, in the case that it is judged that the external device is the second external device, the controller of the communication device transmits the to-be processed data or the image data corresponding to the to-be processed data to the second external device by the predetermined communication protocol. Accordingly, it is possible to automatically judge whether the external device to which the data is transmitted is the first external device or the second external device based on the information received from the external device by the near field communication protocol, and thus it is possible to easily perform data communication with the first or second external device without previously selecting the first or second external device as the counterpart device as the communication destination.

According to a second aspect of the present teaching, there is provided a non-transitory computer-readable medium storing a communication program executable by a controller of a communication device configured to communicate with an external device by a near field communication protocol, the communication program being configured to cause the communication device to perform:

judging a type of the external device based on information received from the external device by the near field communication protocol;

receiving, in a case that it is judged that the type of the external device is a first external device configured to read an image of a document, an image data based on the reading executed by the first external device, from the first external device by a communication protocol; and receiving, in a case that it is judged that the type of the external device is a second external device from which a to-be processed data or an image data corresponding to the to-be processed data is transmitted, the to-be processed data or the image data corresponding to the to-be processed data from the second external device by the communication protocol.

According to the communication program of the second aspect of the present teaching, the controller of the communication device judges the type of the external device based on the information received from the external device by the near field communication protocol. In the case that it is judged that the external device is the first external device, the image data based on the reading executed by the first external device is received from the first external device by the predetermined communication protocol. On the other hand, in the case that it is judged that the external device is the second external device, the controller of the communication device receives the to-be processed data or the image data corresponding to the to-be processed data from the second external device by the predetermined communication protocol. Accordingly, it is possible to automatically judge whether the external device from which the data is transmitted is the first external device or the second external device based on the information received from the external device by the near field communication protocol, and thus it is possible to easily perform data communication with the first or second external device without previously selecting the first or second external device as the counterpart device as the communication destination.

Note that the present teaching can be configured as various aspects such as a communication device, a controller controlling the communication device, a communication protocol, a communication method, and a recording medium storing a communication program. The recording medium storing the communication program can be provided as various forms of recording media such as an optical disk including CD-ROM, DVD, Blu-ray Disc, and the like, a hard disk, and a semiconductor memory.

DESCRIPTION OF THE PREFERRED EMBODIMENTS

Figure 1:
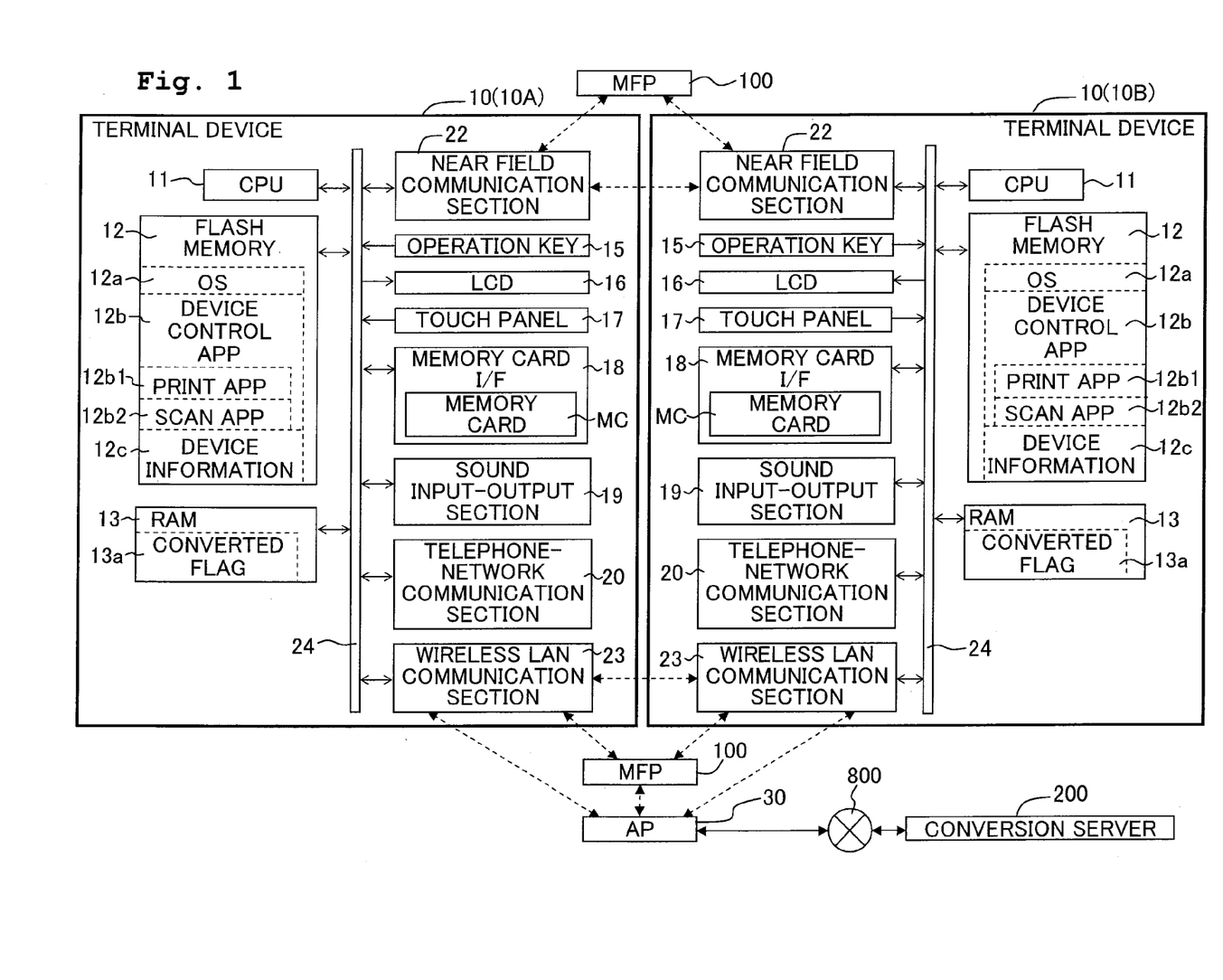
FIG. 1 is a block diagram showing an electrical structure of a terminal device.

Hereinafter, an explanation will be made about a preferred embodiment of the present teaching while referring to the accompanying drawings. FIG. 1 is a block diagram showing an electrical structure of a terminal device 10 installing a device control application 12b (hereinafter referred to as "device control app 12b"), which is an embodiment of a communication program of the present teaching. The terminal device 10 installing the device control app 12b allows a multi function peripheral 100 (hereinafter referred to as "MFP 100") having a plurality of functions such as a print function and a scan function to execute printing based on a printing data transmitted from own device, reading of a document, and receipt of an image data (hereinafter referred to as "scan data") based on the reading of the document.

The terminal device 10 installing the device control app 12b itself can function as a sending terminal 10A or a receiving terminal 10B. A data can be copied from a terminal device 10 functioning as the sending terminal 10A to another terminal device 10 functioning as the receiving terminal 10B. This data-copy function, which will be described later in detail, is achieved by applying or diverting an application for using the print function of the MFP 100 and an application for using the scan function of the MFP 100, those of which are included in the device control app 12b.

The terminal device 10 of this embodiment is configured as a portable terminal such as a smart phone. The terminal device 10 includes a CPU 11, a flash memory 12, a RAM 13, an operation key 15, an LCD 16, a touch panel 17, a memory card interface (memory card I/F) 18, a sound input-output section 19, a telephone-network communication section 20, a near field communication section 22, and a wireless LAN communication section 23. These components or sections are connected to one another via a bus line 24.

The CPU 11 controls each of the components or sections connected to the bus line 24 in accordance with a fixed setting value and/or a program, etc., stored in the flash memory 12 and the like. The flash memory 12 is a rewritable, non/volatile memory. The flash memory 12 stores an operating system 12a (hereinafter referred to as OS 12a) and the device control app 12b. In the following, the CPU 11 executing a program such as the application and the operation system is described simply as the name of program in some cases. For example, the term "application" means the "CPU 11 executing the application" in some cases. The OS 12a is the basic software achieving the standard function of the terminal device 10. In this embodiment, the Android (trade name) OS is adopted as the OS 12a.

The device control app 12b is an application which is provided by a vendor of a device such as the MFP 100, which is to be installed in the terminal device 10 by a user, and which enables the use of the device from the terminal device 10. For instance, the device control app 12b enables the use of the print and scan functions of the device directly from the terminal device 10 without going through a personal computer etc. In this embodiment, the device control app 12b enables the use of the MFP 100 from the terminal device 10, and includes a print application 12b1 (hereinafter referred to as "print app 12b1") for utilizing the print function of the MFP 100 and a scan application 12b2 (hereinafter referred to as "scan app 12b2") for utilizing the scan function of the MFP 100. Each of the processes shown in the flowchart of FIGS. 3A to 3C which will be described later is executed by the CPU 11 in accordance with the print app 12b1. Meanwhile, each of the processes shown in the flowchart of FIGS. 4A to 4C which will be described later is executed by the CPU 11 in accordance with the scan app 12b2.

Device information 12c is stored in the flash memory 12. The device information 12c is identification information of the device which can correspond to the device control app 12b installed into own device. In a case that the device control app 12b is installed into a device, the device information 12c, which is the identification information of the device that has been previously set as the device corresponding to the device control app 12b, is stored. The identification information 12c is appropriately updated as needed, for example, at the time of updating the device control app 12b associated with the version upgrade thereof.

The RAM 13 is a rewritable, volatile memory and includes a temporary area, in which various data are temporarily stored when the CPU 11 executes the device control app 12b and the like. For example, the RAM 13 stores information such as a converted flag 13a. The converted flag 13a is a flag which indicates whether or not the data in a specific file format is converted to the image data in a predetermined file format (hereinafter referred to as "image file") in a case that the terminal device 10 functions as the sending terminal 10A. The data in the specific file format has been converted to the image file in a case that the converted flag 13a is on. The converted flag 13a is initialized to be off when a print screen process (see FIGS. 3A to 3C) which will be described later is started.

The operation key 15 is a mechanical key for inputting an instruction etc., to the terminal device 10, and is provided, for example, in the casing of the terminal device 10. The LCD 16 is a liquid crystal display displaying various screens. The touch panel 17 is provided to be overlaid on the LCD 16, and the instruction etc., is inputted to the terminal device 10 by bringing an indicator such as a finger and a bar into contact with the touch panel 17 or bringing the indicator close to the touch panel 17. The memory card I/F 18 is an interface to which a rewritable, non-volatile memory card MC is installed, and controls data writing or data reading with respect to the memory card MC. The sound input-output section 19 is a device for inputting and outputting sound which includes a microphone, a speaker, and the like. The telephone-network communication section 20 is a circuit for carrying out conversation over telephone via a portable-telephone network (not shown).

The near field communication section 22 is an interface for performing communication by the near field communication in which the communication can be performed within a short distance such as about 10 cm. In this embodiment, the near field communication performed by the near field communication section 22 is a non-contact communication in conformity to NFC standard (hereinafter this communication is referred to as "NFC communication"). The terminal device 10 is configured to perform the NFC communication with another terminal device 10 via the near field communication section 22. Similarly, the terminal device 10 is configured to perform the NFC communication with the MFP 100.

The wireless LAN communication section 23 is an interface for performing a wireless communication by a wireless LAN. In this embodiment, the communication by the wireless LAN communication section 23 is the wireless communication by the wireless LAN in conformity to the standard of IEEE 802.11b/g. In this embodiment, the wireless LAN communication section 23 enables Wi-Fi (trade mark) connection with another terminal device 10 including a wireless LAN communication section 23 in an infrastructure mode via an access point (AP) as the relay device or an ad-hoc mode as the direct connection. Similarly, the wireless LAN communication section 23 enables the Wi-Fi connection with the MFP 100 in the infrastructure mode or the ad-hoc mode. Further, the wireless LAN communication section 23 connects the terminal device 10 and a conversion server 200 on an internet 800 via an AP 30, so that the terminal device 10 and the conversion server 200 can communicate with each other.

The conversion server 200 converts the data in a predetermined file format to the image file in a predetermined format such as JPEG format. The "data in a predetermined file format" to be converted by the conversion server 200 is exemplified by, for example, a PDF file and a file created by Office software (hereinafter referred to as "Office file") such as Excel (trade name) which is a spreadsheet software and Word (trade name) which is a document creation software.

Figure 2A:
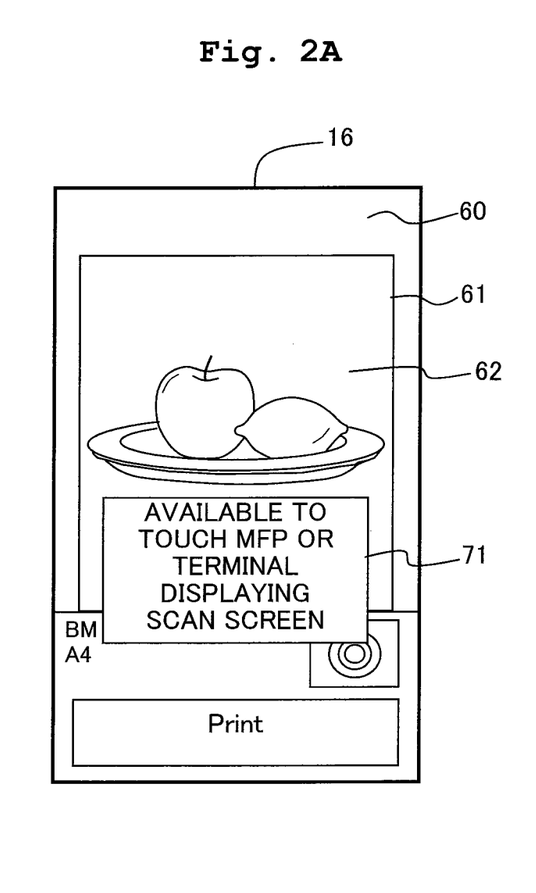
FIG. 2A schematically shows an exemplary print screen, and FIG. 2B schematically shows an exemplary scan screen.

As shown in FIG. 2A, an image 62 based on the image file, which is selected by the user as an object to be printed by the MFP 100, is previewed in a display area 61 of the print screen 60. In a case that the data selected by the user is a data other than the image file, for example, in a case that the data selected by the user is the PDF data, the data of the Office file, or the like, a predetermined dummy image is displayed in the display area 61. Then, in a case that the terminal device 10 receives a converted image file from the conversion server 200, an image corresponding to the received image file is displayed in the display area 61 as the image 62. In a case that the user brings an unillustrated antenna section of the near field communication section 22 of the terminal device 10 close to an unillustrated antenna section of the near field communication section of the MFP 100 in a state that the print screen 60 is displayed on the LCD 16, a printing data corresponding to the image 62 is transmitted to the MFP 100 from the terminal device 10, and the image 62 based on the image file selected by the user is printed on a recording paper based on the printing data by a printer of the MFP 100.

Figure 2B:
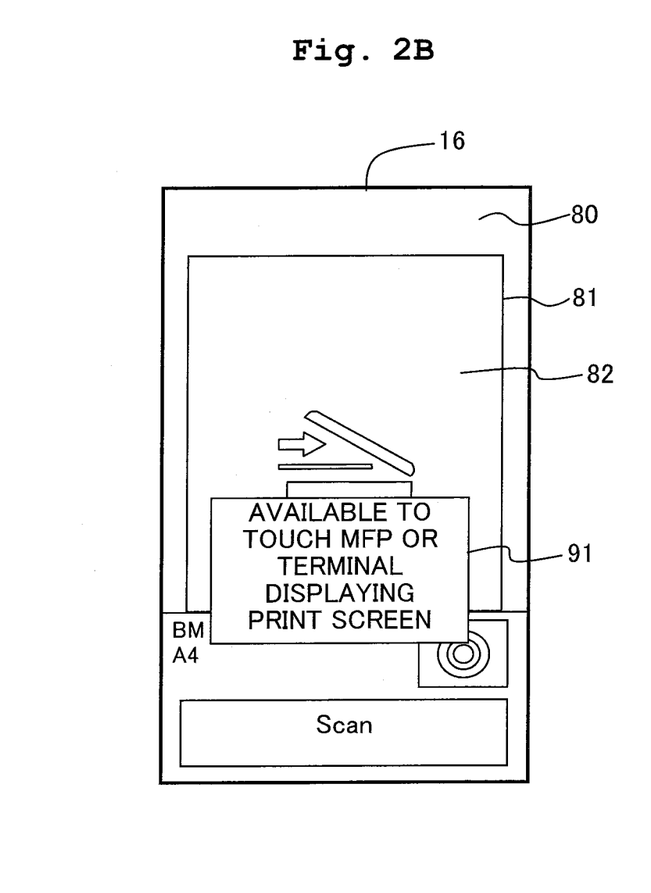

Further, the user is capable of bringing the antenna section of the near field communication section 22 of the terminal device 10 close to an antenna section of the near field communication section 22 of another terminal device 10 displaying a scan screen 80 shown in FIG. 2B on the LCD 16, in the state that the print screen 60 is displayed on the LCD 16. In this case, the data corresponding to the image 62 is transmitted to the terminal device 10 displaying the scan screen 80 and then is copied to this terminal device 10. The data corresponding to the image 62 includes not only the image file obtained by the conversion at the conversion server 200 but also an original data of the image file. As described above, by performing the process in accordance with the print app 12b1, the terminal device 10 enables the MFP 100 to perform the printing based on the image file and is capable of functioning as the sending terminal 10A when the copy of data is performed between the devices. That is, in this embodiment, the data copy function between the devices can be achieved by diverting the application for using the print function of the MFP 100.

As shown in FIG. 2A, a pop-up 71 is displayed on the print screen 60. In the pop-up 71, the message "Available to touch MFP or terminal displaying scan screen" is displayed. The print screen 60 is normally displayed on the assumption that the print function of the MFP 100 is utilized, and has no relation with the data copy function by which no printing is performed. Thus, the user may be less likely to know that the data can be copied to another device in the state that the print screen 60 is displayed. However, in this embodiment, the pop-up 71 including the message, which suggests that the data communication with the device displaying the scan screen 80 is available, is displayed on the print screen 60. Therefore, the user is allowed to know, through the message displayed on the print screen 60, that the data communication irrespective of the printing can be performed, in particular, the data can be copied to another device independently of the printing by the MFP 100, in the state that the print screen 60 is displayed on own device.

The FIG. 2B schematically shows an example of the scan screen 80, which is displayed on the LCD 16 when the scan app 12b2 is started. The scan screen 80 includes a display area 81 for displaying the image of a document read by the MFP 100. The reading of the document is not yet performed by the MFP 100 immediately after the starting of the scan app 12b2, and thus a dummy image 82 is displayed in the display area 81 as shown in FIG. 2B.

In a case that the user brings the antenna section of the near field communication section 22 of the terminal device 10 close to the antenna section of the near field communication section of the MFP 100 in a state that the scan screen 80 is displayed on the LCD 16, a scanner of the MFP 100 reads the document and the terminal device 10 receives the scan data based on the reading from the MFP 100. In a case that the terminal device 10 receives the scan data based on the reading of the document from the MFP 100, an image based on the received scan data is displayed in the display area 82 instead of the dummy image 81.

In a case that the user brings the antenna section of the near field communication section 22 of the terminal device 10 close to the antenna section of the near field communication section 22 of another terminal device 10 (sending terminal 10A) displaying the print screen 60 on the LCD 16, in the state that the scan screen 80 is displayed on the LCD 16, a data is received from the sending terminal 10A. The data received from the sending terminal 10A remains in the sending terminal 10A. Thus, the copy of data from the sending terminal 10A is completed when the data is received by the terminal device 10 displaying the scan screen 80. As described above, by performing the process in accordance with the scan app 12b2, the terminal devices 10 enables the MFP 100 to perform the reading of the document and is capable of functioning as the receiving terminal 10B when the copy of data is performed between the devices. That is, in this embodiment, the data copy function between the devices can be achieved by diverting the application for using the scan function of the MFP 100.

As shown in FIG. 2B, a pop-up 91 is displayed on the scan screen 80. In the pop-up 91, the message "Available to touch MFP or terminal displaying print screen" is displayed. The scan screen 80 is normally displayed on the assumption that the scan function of the MFP 100 is utilized, and has no relation with the data copy function by which the reading of the document is not performed. Thus, the user may be less likely to know that the data can be copied from another device in the state that the scan screen 80 is displayed. However, in this embodiment, since the pop-up 91 including the message, which suggests that the data communication with the device displaying the print screen 60 is available, is displayed on the scan screen 80, the user is allowed to know, through the message displayed on the scan screen 80, that the data communication irrespective of the reading of the document can be performed, in particular, the data can be copied from another device independently of the reading of the document by the MFP 100, in the state that the scan screen 80 is displayed on own device.

Figure 3A:
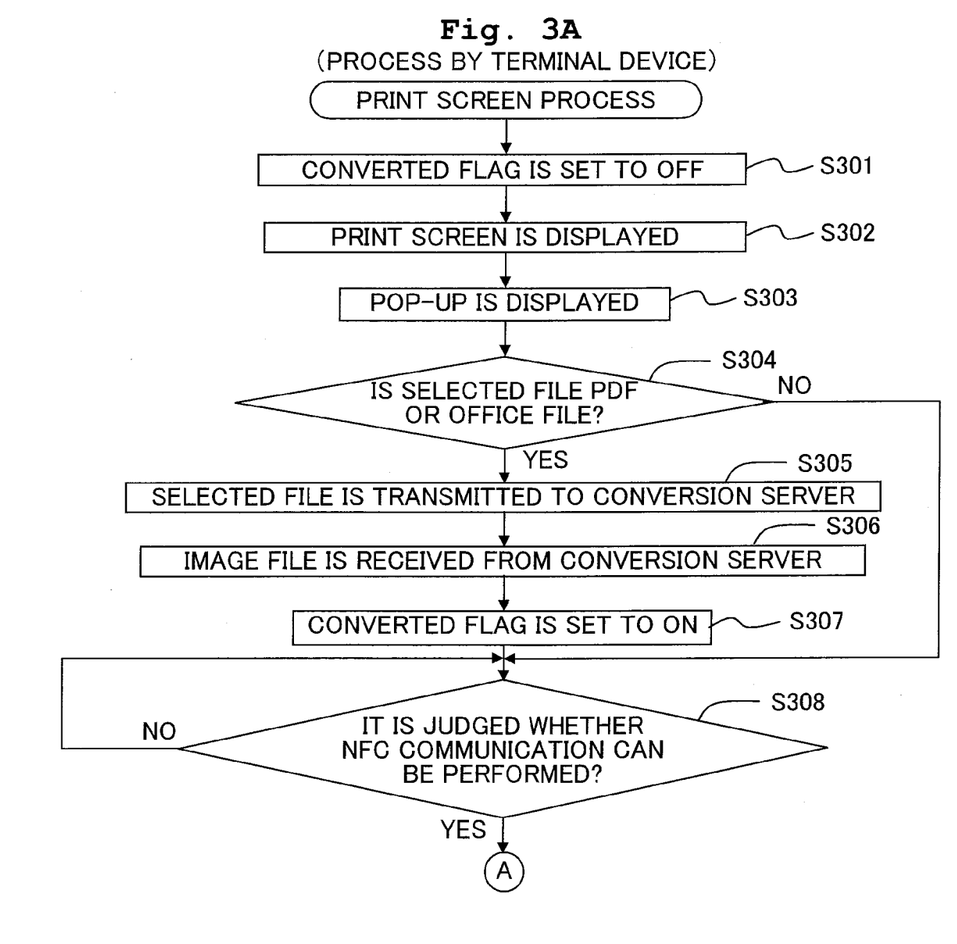
FIGS. 3A, 3B and 3C show flowcharts showing a print screen process.
Figure 3B:
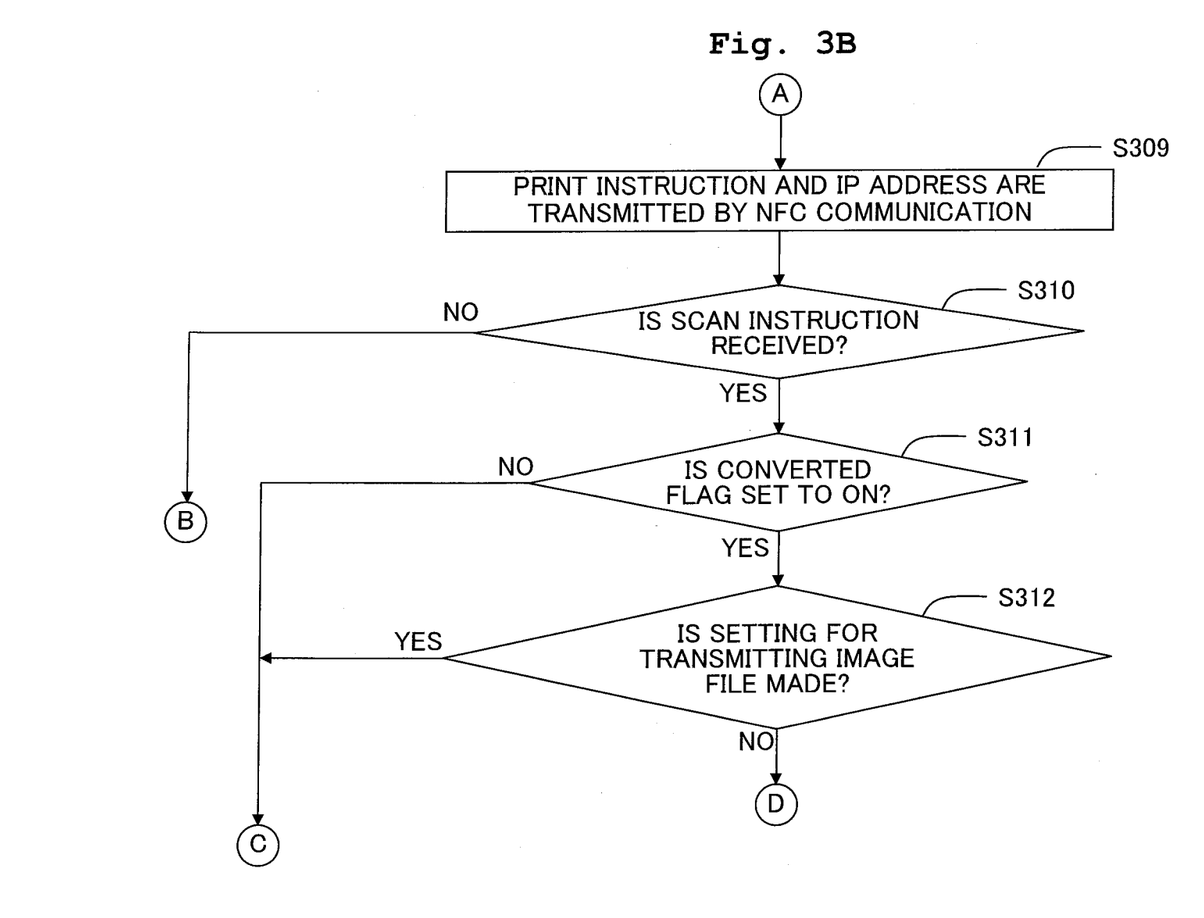
Figure 3C:
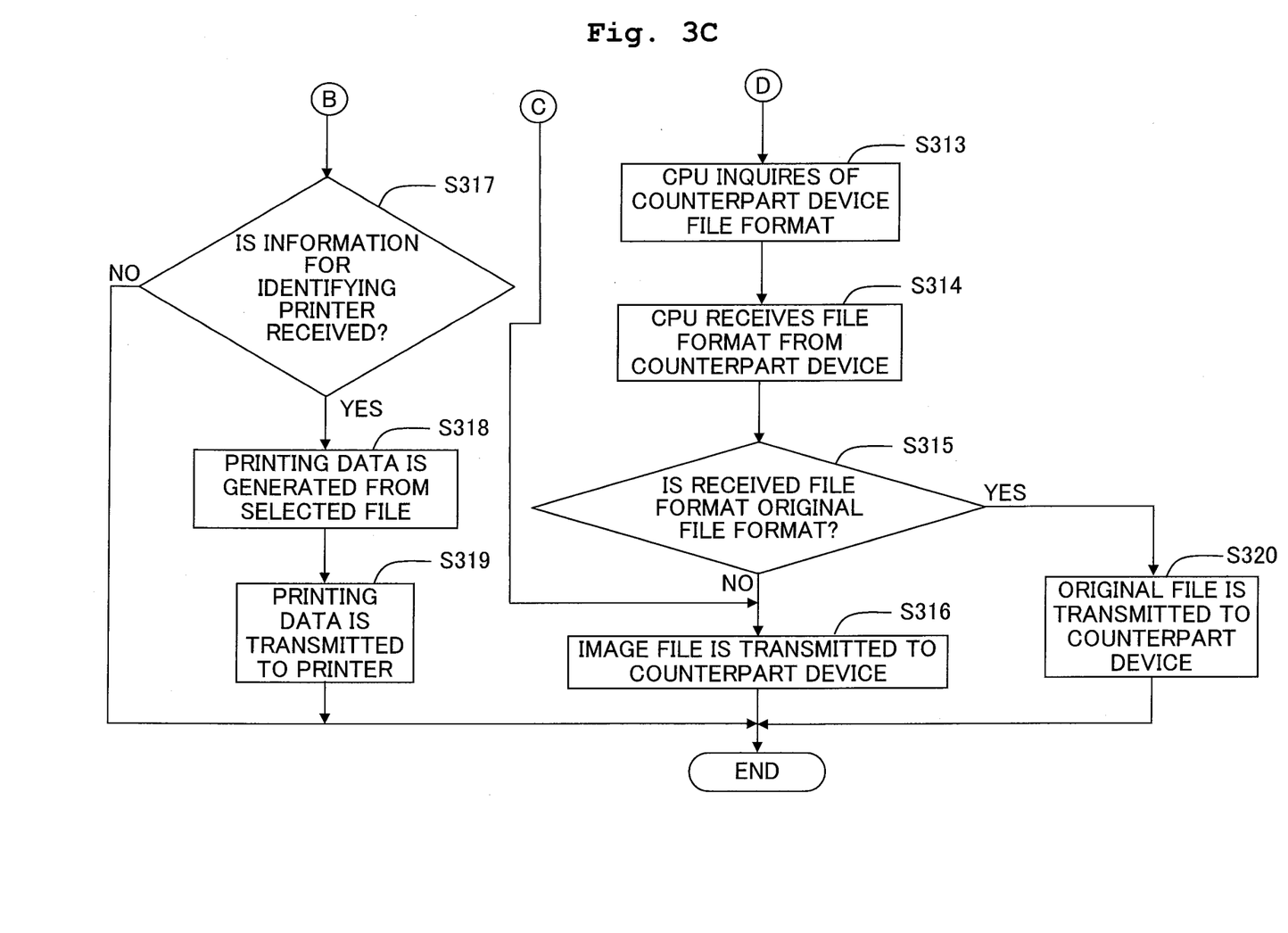

The print screen process shown in FIGS. 3A to 3C is executed by the CPU 11 in accordance with the print app 12b1. This process is started at the time of running the print app 12b after selection of a to-be processed image file by the user. In a step S301 (hereinafter the "step" will be omitted and referred to simply as "S301"), the converted flag 13a is set to off by the CPU 11. The print screen 60 is displayed on the LCD 16 by the CPU 11 (S302). The pop-up 71 including the message, which suggests that the data communication with the device displaying the scan screen 80 is available, is displayed on the print screen 60 of the LCD 16 by the CPU 11 (S303). By performing the process of S303, it is displayed, for example, the screen shown in FIG. 2A on the LCD 16.

In a case that a to-be processed file, which is selected by the user among files stored in the flash memory 12, the memory card MC, and the like, is the PDF or Office file (S304: Yes), that is, in a case that the selected file is a file to be converted into an image file in a predetermined format by the conversion server 200, the CPU 11 transmits the selected file to the conversion server 200 from the wireless LAN communication section 23 (S305). Then, the image file obtained by converting the selected file at the conversion server 200 is received from the conversion server 200 via the wireless LAN communication section 23 (S306). Noted that, in this embodiment, the file transmitted to the conversion server 200 is converted into an image file in the JPEG format. The converted flag 13a is set to on by the CPU 11 (S307), the process proceeds to S308 by the CPU 11. On the other hand, in a case that the to-be processed file selected by the user is neither the PDF nor Office file (S304: No), the process proceeds to S308 by the CPU 11.

In S308, the CPU 11 judges whether or not own device can perform the NFC communication (near field communication) with a counterpart device as a communication destination (hereinafter referred to simply as "counterpart device") such as another terminal device 10. In a case that the CPU 11 judges that own device can not perform the NFC communication (S308: No), the CPU 11 waits until own device can perform the NFC communication. In a case that the CPU 11 judges that the NFC communication between own device and the counterpart device is available (S308: Yes), the CPU 11 transmits a print instruction via the near field communication section 22 to the MFP 100 (S309). The print instruction is information for requesting the execution of printing and an IP address allocated to own device. After the process of S309, the CPU 11 judges whether or not a scan instruction is received via the near field communication section 22 within a predetermined time (for example, within 3 seconds) since it was judged that the NFC communication was available (S310). The scan instruction is transmitted from the device executing the scan app 12b2 and requests the MFP 100 to read the document and transmit the scan data based on the reading of the document. As will be described later while referring to FIGS. 4A to 4C, the scan instruction received by the terminal device 10 executing the print screen process is transmitted from the counterpart device independently of the print instruction transmitted in S309.

In a case that the CPU 11 judges in S310 that the scan instruction is not received (S310: No), the CPU 11 judges whether or not information for identifying a printer is received (S317). In a case that the information received by the CPU 11 via the near field communication section 22 agrees with printer device information which is stored as the device information 12c, the CPU 11 judges in S317 that the information for identifying the printer is received. In a case that the CPU 11 judges that the information for identifying the printer is received (S317: Yes), the CPU 11 judges that the counterpart device which performs the NFC communication with own device is the MFP 100 as the printer. In this case, the CPU 11 generates a printing data from the selected file (S318). In this embodiment, the CPU 11 writes the print setting stored in the flash memory 12, the memory card MC, and the like in a header of the selected to-be printed image file to generate the printing data. In a case that the MFP 100 is a printer which executes printing based on a page description language, the CPU 11 can also generate, in S318, a printing data of the page description language based on the selected image file and the print setting.

The CPU 11 transmits the generated printing data and the information for identifying the printer to the MFP 100 as the printer by the Wi-Fi communication in the ad-hoc mode, of which destination is the received IP address (S319), and then this process is completed. On the other hand, in a case that it is judged in S317 that the information which agrees with the printer device information stored as the device information 12c is not received by the CPU 11 after a predetermined time (for example, 10 minutes) has elapsed since the print instruction was transmitted, the CPU 11 judges that the information for identifying the printer is not received (S317: No). In this case, the CPU 11 completes this process.

In a case that the CPU 11 judges in S310 that the scan instruction is received (S310: Yes), the CPU 11 judges that the counterpart device which performs the NFC communication with own device is the device running the scan app 12b2, that is, the device displaying the scan screen 80. In this case, the CPU 11 executes the processes of S311 to S316, and S320 to transmit the selected file to the device displaying the scan screen 80.

In particular, the CPU 11 judges whether or not the converted flag 13a is set to on (S311). In a case that the CPU 11 judges that the converted flag 13a is set to on (S311: Yes), the CPU 11 judges whether or not a setting for transmitting the image file to the counterpart device instead of the file before the conversion (hereinafter referred to as "original file") is made (S312). This setting is arbitrary made based on a user's operation and stored in a predetermined area of the flash memory 12. In a case that the CPU 11 judges that the setting for transmitting the image file to the counterpart device is not made (S312: No), the CPU 11 inquires of the counterpart device a file format of data to be transmitted (S313) and then the CPU 11 receives, as a reply to the inquiry, the file format of data to be transmitted from the counterpart device (S314). The communication in S313 and S314 is performed by the NFC communication.

In a case that the file format received from the counterpart device is an original file format (S315: Yes), the CPU 11 transmits, to the counterpart device, the original file before the conversion instead of the image file generated by the conversion at the conversion server 200, by the Wi-Fi communication in the ad-hoc mode, of which destination is the IP address received together with the scan instruction (S320). Then, this process is completed. On the other hand, in a case that the file format received from the counterpart device is not the original file (S315: No), the CPU 11 transmits the image file generated by the conversion at the conversion server 200 to the counterpart device by the Wi-Fi communication similar to S316 (S316). Then, this process is completed.

In a case that the CPU 11 judges in S311 that the converted flag 13a is not set to on (S311: No), the CPU 11 transmits the selected image file to the counterpart device (S316), and then this process is completed. In a case that the CPU 11 judges in S312 that the setting for transmitting the image file to the counterpart device is made (S312: Yes), the CPU 11 transmits the selected image file or the image file generated by the conversion at the conversion server 200 to the counterpart device (S316). Then, this process is completed. In a case that a plurality of to-be processed files are selected, the CPU 11 can execute each of the processes including S304 to S307 and the process of S316 or S320 depending on the judgment in S315 according to the file format of each of the files.

According to the print app 12b1 included in the device control app 12b of this embodiment, the terminal device 10 is capable of automatically judging whether the counterpart device is the MFP 100 as the printer or another terminal device 10 as the device to which the data is copied, based on whether the information received by the terminal device 10 is the information for identifying the printer or the scan instruction. Therefore, the user is not required to previously select any of the MFP 100 and another terminal device 10 as the counterpart device, after starting the print app 12b1. Accordingly, the communication between the terminal device 10 and the MFP 100 or another terminal device 10 can be performed easily, and it is possible to transmit the data corresponding to each counterpart device. Especially, the data can be copied to the counterpart device to which the scan instruction can be transmitted.

According to the print app 12b1, in a case that the file selected by the user is a file in a predetermined file format such as the PDF file, the file in the predetermined file format is converted to the image file by the conversion server 200. Thus, even when the counterpart device is a device which can not process the PDF file, the Office file, and the like, each of the image files corresponding to the PDF file, the Office file, and the like can be transmitted to the counterpart device and the content of each of the files can be displayed. Whether the image file converted by the conversion server 200 is transmitted or whether the original data is transmitted is determined depending on the setting which is arbitrary made on the basis of the user's operation or the reply of the inquiry sent to the counterpart device. Therefore, it is possible to transmit the data suitable for the situation to the counterpart device. Especially, the type of data to be transmitted is determined depending on the reply of the inquiry sent to the counterpart device, and thus it is possible to transmit the data, the type of which is suitable for the counterpart device.

Figure 4A:
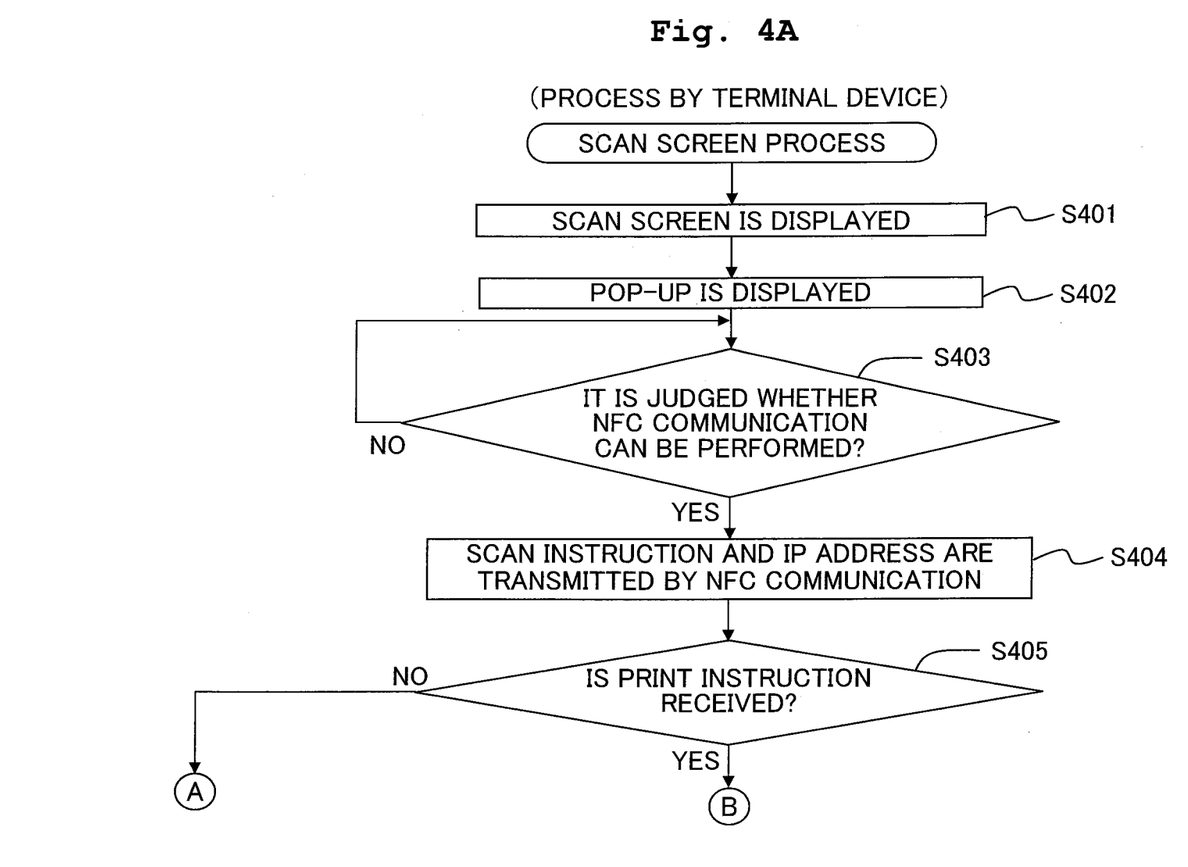
FIGS. 4A, 4B and 4C show flowcharts showing a scan screen process.
Figure 4B:
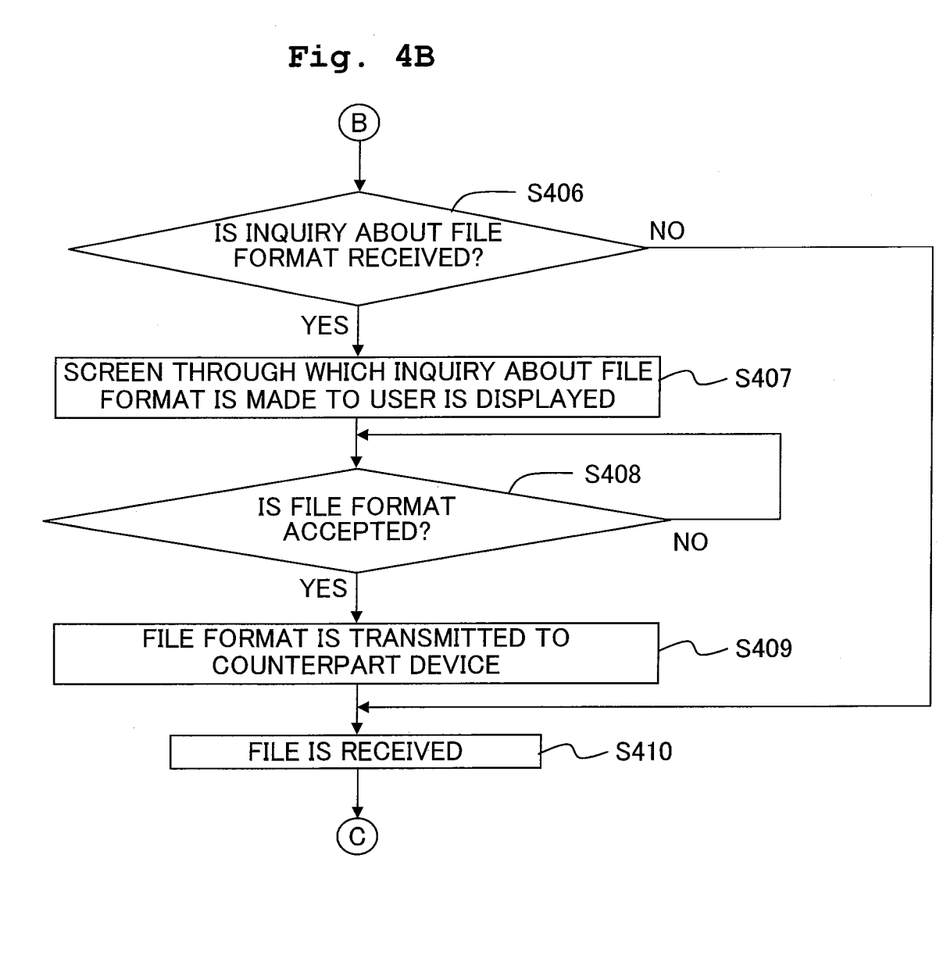
Figure 4C:
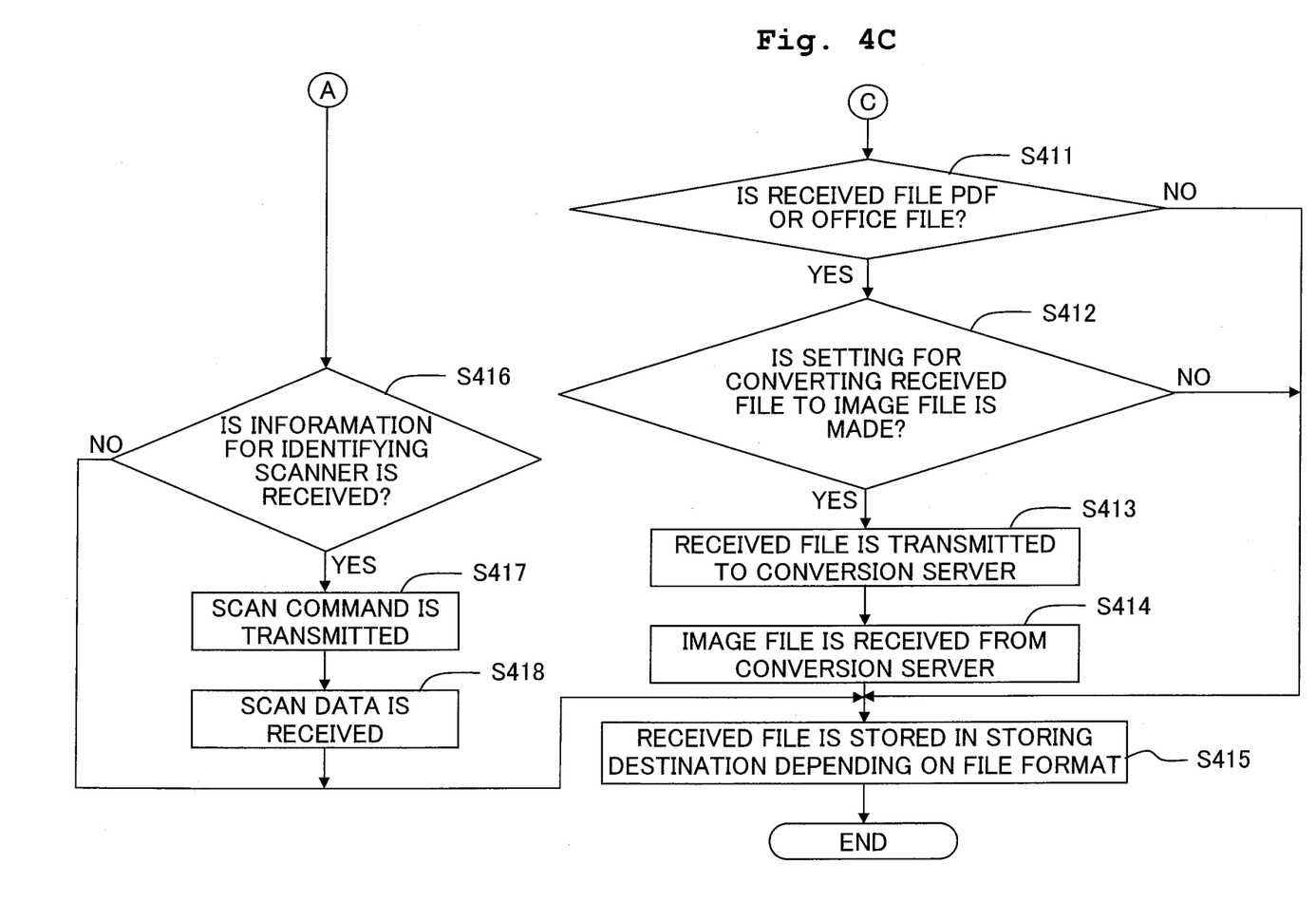

A scan screen process shown in FIGS. 4A to 4C is executed by the CPU 11 in accordance with the scan app 12b2. This process is started when the user starts the scan app 12b2. The scan screen 80 is displayed on the LCD 16 by the CPU 11 (S401). The pop-up 91 including a message which suggests that data communication with the device displaying the print screen 60 is available is displayed on the scan screen 80 of the LCD 16 by the CPU 11 (S402). By performing the process of S402, it is displayed, for example, the screen shown in FIG. 2B on the LCD 16.

Next, the CPU 11 judges whether or not the NFC communication between own device and the counterpart device such as another terminal device 10 is available (S403). In a case that the CPU 11 judges that own device can not perform the NFC communication (S403: No), the CPU 11 waits until own device can perform the NFC communication. In a case that the CPU 11 judges that the NFC communication between own device and the counterpart device is available (S403: Yes), the CPU 11 transmits a scan instruction via the near field communication section 22 to the MFP 100 (S404). The scan instruction is information for requesting reading of a document and transmission of scan data based on the reading of the document, and an IP address allocated to own device. After the process of S404, the CPU 11 judges whether or not a print instruction is received via the near field communication section 22 within a predetermined time (for example, within 3 seconds) since it was judged that the NFC communication was available (S405). The print instruction is transmitted from the device executing the print app 12b1 and requests the MFP 100 to execute the printing. As shown in the flowchart of FIGS. 3A to 3C, the print instruction received by the terminal device 10 executing the scan screen process is transmitted from the counterpart device independently of the print instruction transmitted in S404.

In a case that the CPU 11 judges in S405 that the print instruction is not received (S405: No), the CPU 11 judges whether or not information for identifying a scanner is received (S416). In a case that the information received by the CPU 11 via the near field communication section 22 agrees with scanner device information which is stored as the device information 12c, the CPU 11 judges in S416 that the information for identifying the scanner is received. In a case that the CPU 11 judges that the information for identifying the scanner is received (S416: Yes), the CPU 11 judges that the counterpart device which performs the NFC communication with own device is the MFP 100 as the scanner. In this case, the CPU 11 transmits, to the MFP 100 as the scanner, a scan command, which is a command for staring the reading of the document, by the Wi-Fi communication in the ad-hoc mode of which destination is the IP address received together with the information for identifying the scanner (S417). The scan command includes a scan setting stored in the flash memory 12 and the like.

The CPU 11 receives the scan data (image data) based on the reading of the document, which is executed by the MFP 100 in accordance with the transmitted scan command, from the MFP 100 by the Wi-Fi communication similar to S417 (S418), and then this process is completed. On the other hand, in a case that it is judged in S416 that the information which agrees with the scanner device information stored as the device information 12c is not received by the CPU 11 after a predetermined time (for example, 1 minute) has elapsed since the scan instruction was transmitted, the CPU 11 judges that the information for identifying the scanner is not received (S416: No). In this case, the CPU 11 completes this process.

In a case that the CPU 11 judges in S405 that the print instruction is received (S405: Yes), the CPU 11 judges whether or not an inquiry about a file format is received from the counterpart device which performs the NFC communication with own device (S406). That is, the CPU 11 judges whether or not the inquiry, which is transmitted by the counterpart device (terminal device 10) in S313 of FIGS. 3A to 3C, is received. In a case that the CPU 11 judges that the inquiry about the file format is received (S406: Yes), a screen through which the inquiry about the file format is made to the user (not shown) is displayed on the LCD 16 by the CPU 11 (S407). In a case that designation of the file format to the inquiry screen is not yet accepted (S408: No), the CPU 11 waits until the designation is accepted. In a case that the CPU 11 accepts the designation of the file format to the inquiry screen (S408: Yes), the accepted file format is transmitted to the counterpart device by the NFC communication (S409). Then, the process proceeds to S410. In a case that the process of S409 is executed, the counterpart device (terminal device 10) receives, in S314 of FIGS. 3A to 3C, the file format designated by own device. On the other hand, in a case that the inquiry about the file format is not received from the counterpart device in S406 even though a few seconds have passed after the reception of the print instruction, the CPU 11 judges that the inquiry about the file format is not received (S406: No). Then, the process proceeds to S410 by the CPU 11.

In S410, the CPU 11 receives the file from the counterpart device. That is, the CPU 11 receives the file transmitted from the counterpart device (terminal device 10) in S316 or S320 of FIGS. 3A to 3C. In a case that the designation of the file format to the screen displayed by the process of S407 is made by the user, the CPU 11 receives the file in the designated file format in S410. In a case that the received file is the PDF or Office file and that a setting for converting the PDF or Office file to the image file is made (S411: Yes, S412: Yes), the CPU 11 transmits the received file from the wireless LAN communication section 23 to the conversion server 200 (S413). Therefore, even when the terminal device 10 can not process the PDF or Office file, since the PDF or Office file is converted to the image file, the content of PDF or Office file can be displayed on the LCD 16. The setting for converting the PDF or Office file to the image file is an arbitrary setting based on the user's operation. Or, it may be configured so that this setting is always made in a case that the terminal device 10 can not process the PDF or Office file.

After the process of S413, the CPU 11 receives the image file in the JPEG format, which has been converted from the PDF or Office file at the conversion server 200, from the conversion server 200 via the wireless LAN communication section 23 (S414). Next, the CPU 11 stores the file received from the conversion server 200 in a predetermined storing destination (S415), and then this process is completed. Noted that the predetermined storing destination may be a predetermined storing destination depending on the file format. On the other hand, in a case that the received file is neither the PDF nor Office file (S411: No) or that the setting for converting the PDF or Office file to the image file is not made (S412: No), the CPU 11 stores the file received from the counterpart device in the predetermined storing destination (S415), and then this process is completed. In a case that the terminal device 10 receives a plurality of files from the counterpart device in S410, the CPU 11 can execute each of the processes including S411 to S415 depending on the file format of each of the files.

According to the scan app 12b2 included in the device control app 12b of this embodiment, the terminal device 10 is capable of automatically judging whether the counterpart device is the MFP 100 as the scanner or another terminal device 10 as the device from which the data is copied, based on whether the information received by the terminal device 10 is the information for identifying the scanner or the print instruction. Therefore, the user is not required to previously select any of the MFP 100 and another terminal device 10 as the counterpart device, after staring the scan app 12b2. Accordingly, the communication between the terminal device 10 and the MFP 100 or another terminal device 10 can be performed easily, and it is possible to receive the data corresponding to each counterpart device. Especially, the data can be copied to own device from the counterpart device from which the print instruction can be transmitted.

As described above, the terminal device 10 operating according to the print app 12b1 transmits the print instruction, which is information for requesting the execution of printing, in S309 in order to utilize the print function of the MFP 100. The print instruction is information which is not required to be transmitted to the counterpart device unrelated to the printing. Meanwhile, the terminal device 10 operating according to the scan app 12b2 is a device operating independently of the printing. This device, however, receives the data from the terminal device from which the print instruction is transmitted, namely, the terminal device 10 operating according to the print app 12b1, on condition that the print instruction is received. Therefore, the print app 12b1 for using the print function of the MFP 100 can be diverted as an application for allowing the terminal device 10 to function as the sending terminal 10A.

Similarly, the terminal device 10 operating according to the scan app 12b2 transmits the scan instruction, which is information for requesting the transmission of scan data based on the reading of the document, in S404 in order to utilize the scan function of the MFP 100. The scan instruction is information which is not required to be transmitted to the counterpart device unrelated to the reading of the document. Meanwhile, the terminal device 10 operating according to the print app 12b1 is a device operating independently of the reading of the document. This device, however, transmits the data to the terminal device from which the scan instruction is transmitted, namely, the terminal device 10 operating according to the scan app 12b2, on condition that the scan instruction is received. Therefore, the scan app 12b2 for using the scan function of the MFP 100 can be diverted as an application for allowing the terminal device 10 to function as the receiving terminal 10B.

In the above embodiment, the print app 12b1 and the scan app 12b2 are examples of a communication program of the present teaching; the terminal device 10 is an example of a communication device; the terminal device 10, the MFP 100, and the conversion server 200 are examples of an external device; the MFP 100 is an example of a first external device; the terminal device 10 is an example of a second external device; the conversion server 200 is an example of a conversion device; the CPU 11 is an example of a controller; the flash memory 12 and the memory card MC are examples of a storage section; the near field communication section 22 and the wireless LAN communication section 23 are examples of a communication section; the NFC is an example of a near field communication protocol; the Wi-Fi is an example of a predetermined communication protocol; the selected file is an example of a to-be processed data; the print setting stored in the flash memory 12 and the memory card MC is an example of a print setting; the printing data generated by the process of S318 is an example of a printing data; the image file generated by the conversion at the conversion server 200 is an example of an image data corresponding to the to-be processed data; the information for identifying the printer is an example of information indicating that the external device is configured to execute the printing based on the printing data; the scan instruction is an example of information requesting data transmission and information requesting transmission of an image data based on reading of a document; the print instruction is an example of information requesting execution of the printing based on the printing data transmitted from own device according to the present teaching; the print instruction is an example of information requesting output of an image based on a data transmitted from the external device according to the present teaching; the print instruction is an example of information requesting the execution of the printing based on the printing data transmitted from the external device according to the present teaching; the setting for transmitting the image file and the file format received by the process of S314 are examples of selection information received by own device; the information for identifying the scanner is an example of information indicating the external device is configured to read the image of the document; the print screen 60 is an example of a screen related to the printing; the pop-up 71 and the pop-up 91 are examples of information related to the second external device; and the scan screen 80 is an example of a screen related to the reading of the document.

The CPU 11 executing the processes of S310 and S317 is an example of a judgment mechanism of the present teaching; the CPU 11 executing the process of S318 is an example of a printing data generation mechanism; the CPU 11 executing the process of S319 is an example of a first sending mechanism; the CPU 11 executing the processes of S316 and S320 is an example of a second sending mechanism; the CPU 11 executing the process of S309 is an example of a third sending mechanism; the CPU 11 executing the process of S302 is an example of a display control mechanism of the present teaching; the CPU 11 executing the process of S305 is an example of a fourth sending mechanism; the CPU 11 executing the process of S306 is an example of a receiving mechanism; the CPU 11 executing the processes of S312 and S315 is an example of a transmitted data selection mechanism; the CPU 11 executing the process of S313 is an example of an inquiry mechanism; the CPU 11 executing the process of S303 is an example of a second display control mechanism of the present teaching; the CPU 11 executing the processes of S405 and S416 is an example of a judgment mechanism of the present teaching; the CPU 11 executing the process of the S418 is an example of a first receiving mechanism; the CPU 11 executing the process of the S410 is an example of a second receiving mechanism; the CPU 11 executing the process of the S404 is an example of a sending mechanism; the CPU 11 executing the process of the S401 is an example of the display control mechanism of the present teaching; and the CPU 11 executing the process of the S402 is an example of the second display control mechanism of the present teaching.

The present teaching has been explained above based on the embodiment. The present teaching, however, is not limited at all only to the embodiment described above; and various kinds of modifications, changes, etc., are possible within a range without deviating from the gist or essential characteristics of the present teaching.

For example, in the above embodiment, the explanation has been made by exemplifying the case in which the print app 12b1, which is the communication program for allowing the terminal device 10 to function as the sending terminal 10A, and the scan app 12b, which is the communication program for allowing the terminal device 10 to function as the receiving terminal 10B, are provided as one device control app 12b to the user. The present teaching, however, can be performed, even when the print app 12b1 and the scan app 12b are independently provided to the user, provided that the print app 12b1 and the scan app 12b are related to each other. Therefore, the device which allows the print app 12b1 and the scan app 12b2 to execute the print function and the scan function respectively is not limited to the MFP 100 as described above, and may be a printer having a simple function and a scanner having a simple function.

In the above embodiment, the communication program which allows the terminal device 10 to function as the sending terminal 10A has been exemplified by the print app 12b1. However, an application configured to transmit, to the counterpart device, information to request an external device to execute a predetermined output based on a data, such as an application for displaying the image based on the image data on the LCD of another device and an application for playing a moving image or video data and a music data using another device, may be adopted as the communication program which allows the terminal device 10 to function as the sending terminal 10A. Further, the communication program which allows the terminal device 10 to function as the receiving terminal 10B has been exemplified by the scan app 12b2. However, an application configured to transmit, to the counterpart device, information to request the external device to transmit a data, such as web browser, may be adopted as the communication program which allows the terminal device 10 to function as the receiving terminal 10B.

In the above embodiment, the explanation has been made by exemplifying the case in which the data is copied from the sending terminal 10A to the receiving terminal 10B by the communication program of the present teaching. The present teaching, however, is also applicable to a case in which the data is moved from the sending terminal 10A to the receiving terminal 10B. In the above embodiment, the data which is copied from the sending terminal 10A to the receiving terminal 10B by the communication program of the present teaching has been exemplified by the image file or image data, the PDF data, and the like. The present teaching, however, may be applicable to various data such as the moving image or video data and the music data without limiting to the data as described above.

In the above embodiment, the communication device installing the communication program of the present teaching has been exemplified by the terminal device 10. However, it is also possible to adopt, for example, a tablet terminal, a digital camera, and various kinds of personal computers such as a laptop computer, as the device which is capable of installing the communication program of the present teaching, without limiting to the terminal device 10. Further, in the above embodiment, the communication device has been exemplified by the terminal device 10 having the function for executing the conversation over the telephone. The communication device, however, may be a communication device which does not have the function for executing the conversation over the telephone. In the above embodiment, the sending terminal 10A and the receiving terminal 10B have been exemplified by the same type of communication device (terminal device 10). However, the sending terminal 10A and the receiving terminal 10B may be a combination of different types of communication devices. In the above embodiment, the OS 12a installed in the terminal device 10 has been exemplified by the Android (trade name). However, any other OS may be used as the OS 12a.

In the above embodiment, the data transmission and data reception executed, for example, in the processes including S316, S319, S320, S410, and S418 are performed by the wireless LAN communication (Wi-Fi communication). However, it is possible to use any other communication protocol, such as Bluetooth (trade name) communication, infrared communication, near field communication, and communication by a wired connection using a cable and LAN. In the above embodiment, the near field communication has been exemplified by the non-contact communication (NFC communication) in conformity to NFC standard. However, a non-contact communication in conformity to any other standard, such as TransferJet (trade name), may be adopted.

In the above embodiment, in the case that the print instruction is transmitted and that the scan instruction is received, in the state that the print screen 60 is displayed, the data is transmitted to the counterpart device from which the scan instruction is transmitted. However, it is possible to adopt various screens, such as a print setting screen displayed after the start of the print app 12b1, provided that the screen is related to the printing, as the screen displayed on the LCD 16 at the time of transmitting the print instruction and receiving the scan instruction, without limiting to the print screen 60. Similarly, it is possible to adopt various screens, such as a scan setting screen displayed after the start of the scan app 12b2, provided that the screen is related to the reading of the document, as the screen displayed on the LCD 16 at the time of transmitting the scan instruction and receiving the print instruction, without limiting to the scan screen 80.

In the above embodiment, in the case that it is judged that the NFC communication between own device and the counterpart device is available in the state that the print screen 60 is displayed, the print instruction and the IP address are transmitted. In this case, instead of transmitting the print instruction and the IP address, in a case that the information for identifying the printer or the scan instruction is received from the counterpart device, the data may be transmitted to a corresponding device. Similarly, in the above embodiment, in the case that it is judged that the NFC communication between own device and the counterpart device is available in the state that the scan screen 80 is displayed, the scan instruction and the IP address are transmitted. In this case, instead of transmitting the scan instruction and the IP address, in a case that the information for identifying the scanner or the print instruction is received from the counterpart device, the data may be received from a corresponding device.

In the above embodiment, in the case that the selected file has a predetermined file format such as the PDF file, the terminal device 10 executing the print app 12b1 (that is, sending terminal 10A) transmits the file in the predetermined file format to the conversion server 200 and the file in the predetermined file format is converted into the image file. However, even when the selected file has the predetermined file format, the file in the predetermined file format may be transmitted to the counterpart device without being converted into the image file. Further, in the above embodiment, the conversion server 200 is configured to convert the data in the predetermined file format into the image file in the JPEG format. However, it is possible to adopt various formats such as PNG, GIF, and BMP as the format of the image file generated by the conversion, without limiting to the JPEG format. In the above embodiment, the conversion server 200 is a device different or separate from the terminal device 10 and they are connected to each other via network. The present teaching, however, is not limited thereto. For example, the terminal device 10 may have the function of the conversion server 200 and the data in a predetermined file format may be converted to the image file such as the JPEG format by the terminal device 10.

In the above embodiment, the terminal device 10 transmits the IP address allocated to own device to the counterpart device together with the print instruction and the scan instruction in S309 or S404. However, instead of the IP address, it is possible to appropriately adopt any other information, such as SSID allocated to own device, provided that the information can be a destination for the wireless communication.

In the above embodiment and the modified embodiments, the explanation has been made by exemplifying the configuration in which the CPU 11 executes each of the processes described in FIGS. 3 and 4. However, each of the processes described in FIGS. 3 and 4 may be executed by a plurality of CPUs cooperatively. Or, each of the processes described in FIGS. 3 and 4 may be executed by an IC such as ASIC. Alternatively, each of the processes described in FIGS. 3 and 4 may be executed by the CPU 11 and the IC such as the ASIC cooperatively.

What is claimed is:

1. A non-transitory computer-readable medium storing a communication program executable by a controller of a communication device configured to communicate with an external device by a near field communication protocol,
the communication program being configured to cause the communication device to perform:
judging a type of the external device based on information received from the external device by the near field communication, and based on a condition that the near field communication becomes available;
generating, based on a judgment in which the type of the external device is a first external device configured to execute printing based on a printing data, the printing data based on a to-be processed data and a print setting stored in a storage section;
transmitting, based on the judgment in which the type of the external device is the first external device configured to execute printing based on the printing data, the generated printing data to the first external device by a communication protocol; and
transmitting, based on a judgment in which the type of the external device is a second external device to which the to-be processed data or an image data corresponding to the to-be processed data is transmitted, the to-be processed data or the image data corresponding to the to-be processed data to the second external device by the communication protocol;
wherein it is judged that the type of the external device is the first external device in a case that the information received from the external device is information indicating that the external device is configured to execute the printing based on the printing data; and
wherein it is judged that the type of the external device is the second external device in a case that the information received from the external device is information requesting data transmission.

2. The computer-readable medium according to claim 1, wherein the communication program is configured to cause the communication device to perform:
transmitting information requesting execution of the printing based on the printing data transmitted from the communication device, to the external device by the near field communication protocol; and
judging that the type of the external device is the second external device, in the case that the communication program causes the communication device to perform judging the type of the external device, that the information requesting the execution of the printing is transmitted to the external device by the near field communication protocol, and that the information requesting the data transmission is received from the external device by the near field communication protocol independently of the transmission of the information requesting the execution of the printing.

3. The computer-readable medium according to claim 1, wherein the communication program is configured to cause the communication device to perform:
- displaying a screen relating to the printing on a display; and
- judging that the type of the external device is the second external device, in the case that the communication program causes the communication device to perform judging the type of the external device, and that the information requesting the data transmission is received from the external device by the near field communication protocol in a state that the screen relating to the printing is displayed on the display.

4. The computer-readable medium according to claim 1, wherein the information requesting the data transmission is information requesting transmission of an image data based on reading of a document.

5. The computer-readable medium according to claim 1, wherein the communication program is configured to cause the communication device to perform:
- transmitting, in a case that the to-be processed data is a data in a predetermined file format, the to-be processed data to a conversion device which is an external device configured to convert the data in the predetermined file format to an image data in a file format different from the predetermined file format;
- receiving, in a case that the to-be processed data is transmitted to the conversion device, an image data, which is generated from the to-be processed data by being converted at the conversion device, from the conversion device by the communication protocol; and
- transmitting, in the case that it is judged that the type of the external device is the second external device, the to-be processed data or the image data, which is received from the conversion device and corresponds to the to-be processed data, to the second external device.

6. The computer-readable medium according to claim 5, wherein the communication program is configured to cause the communication device to perform:
- selecting a transmitted data to be transmitted to the second external device, among the image data received from the conversion device and the to-be processed data corresponding to the image data, based on selection information received by the communication device; and
- transmitting, in the case that it is judged that the type of the external device is the second external device, a data selected as the transmitted data to the second external device.

7. The computer-readable medium according to claim 6, wherein the communication program is configured to cause the communication device to perform:
- inquiring of the second external device as to which one of the image data received from the conversion device and the to-be processed data corresponding to the image data is transmitted to the second external device; and
- selecting, in a case that the inquiry has been performed, the transmitted data based on the selection information, which is transmitted from the second external device and is received by the communication device.

8. The computer-readable medium according to claim 1, wherein the communication program is configured to cause the communication device to perform:
- displaying a screen relating to the printing on a display; and
- displaying information relating to the second external device on the screen relating to the printing.

9. A non-transitory computer-readable medium storing a communication program executable by a controller of a communication device configured to communicate with an external device by a near field communication protocol,
the communication program being configured to cause the communication device to perform:
- judging a type of the external device based on information received from the external device by the near field communication protocol, and based on a condition that the near field communication becomes available;
- receiving, based on a judgment in which the type of the external device is a first external device configured to read an image of a document, an image data based on the reading executed by the first external device, from the first external device by a communication protocol; and
- receiving, based on a judgment in which the type of the external device is a second external device from which a to-be processed data or an image data corresponding to the to-be processed data is transmitted, the to-be processed data or the image data corresponding to the to-be processed data from the second external device by the communication protocol;
- wherein it is judged that the type of the external device is the first external device in a case that the information received from the external device is information indicating that the external device is configured to read the image of the document; and
- wherein it is judged that the type of the external device is the second external device in a case that the information received from the external device is information requesting output of an image based on a data transmitted from the external device.

10. The computer-readable medium according to claim 9, wherein the communication program is configured to cause the communication device to perform:
- transmitting information requesting transmission of the image data based on the reading of the document, to the external device by the near field communication protocol; and
- judging that the type of the external device is the second external device, in the case that the communication program causes the communication device to perform judging the type of the external device, that the information requesting the transmission of the image data based on the reading of the document is transmitted to the external device by the near field communication protocol, and that the information requesting the output of the image based on the data transmitted from the external device is received from the external device by the near field communication protocol independently of the transmission of the information requesting the transmission of the image data based on the reading of the document.

11. The computer-readable medium according to claim 9, wherein the communication program is configured to cause the communication device to perform:
- displaying a screen relating to the reading of the document on a display; and
- judging that the type of the external device is the second external device, in the case that the communication program causes the communication device to perform judging the type of the external device, and that the information requesting the output of the image based on the data transmitted from the external device is received from the external device by the near field communication protocol in a state that the screen relating to the reading of the document is displayed on the display section.

12. The computer-readable medium according to claim 9, wherein the information requesting the output of the image based on the data transmitted from the external device is information requesting execution of printing based on a printing data transmitted from the external device.

13. The computer-readable medium according to claim 9, wherein the communication program is configured to cause the communication device to perform:
   displaying a screen relating to the reading of the document on a display; and
   displaying information relating to the second external device on the screen relating to the reading of the document.

14. A communication device configured to communicate with an external device, comprising:
   a controller and a communication section configured to communicate with the external device by a near field communication protocol,
   wherein the controller is configured to perform:
   judging a type of the external device based on information received from the external device by the near field communication protocol via the communication section, and based on a condition that the near field communication becomes available;
   generating, based on a judgment in which the type of the external device is a first external device configured to execute printing based on a printing data, the printing data based on a to-be processed data and a print setting stored in a storage section;
   transmitting, based on the judgment in which the type of the external device is the first external device configured to execute printing based on the printing data, the generated printing data to the first external device via the communication section by a communication protocol; and
   transmitting, based on a judgment in which the type of the external device is a second external device to which the to-be processed data or an image data corresponding to the to-be processed data is transmitted, the to-be processed data or the image data corresponding to the to-be processed data to the second external device by the communication protocol via the communication section;
   wherein it is judged that the type of the external device is the first external device in a case that the information received from the external device is information indicating that the external device is configured to execute the printing based on the printing data; and
   wherein it is judged that the type of the external device is the second external device in a case that the information received from the external device is information requesting data transmission.

15. A communication device configured to communicate with an external device, comprising:
   a controller and a communication section configured to communicate with the external device by a near field communication protocol,
   wherein the controller is configured to perform:
   judging a type of the external device based on information received from the external device by the near field communication protocol via the communication section, and based on a condition that the near field communication becomes available;
   receiving, based on a judgment in which the type of the external device is a first external device configured to read an image of a document, an image data based on the reading executed by the first external device, from the first external device by a communication protocol via the communication section; and
   receiving, based on a judgment in which the type of the external device is a second external device from which a to-be processed data or an image data corresponding to the to-be processed data is transmitted, the to-be processed data or the image data corresponding to the to-be processed data from the second external device by the communication protocol via the communication section;
   wherein it is judged that the type of the external device is the first external device in a case that the information received from the external device is information indicating that the external device is configured to read the image of the document; and
   wherein it is judged that the type of the external device is the second external device in a case that the information received from the external device is information requesting output of an image based on a data transmitted from the external device.

* * * * *